United States Patent [19]

Vapaaoksa et al.

[11] Patent Number: 5,076,849
[45] Date of Patent: Dec. 31, 1991

[54] TRANSPARENT METAL OXIDE PIGMENT AND METHOD FOR ITS PREPARATION

[75] Inventors: Pekka J. Vapaaoksa; Pekka J. Eskelinen, both of Pori, Finland

[73] Assignee: Kemira Oy, Helsinki, Finland

[21] Appl. No.: 456,322

[22] Filed: Dec. 26, 1989

[51] Int. Cl.$^5$ ............................................. C04B 14/04
[52] U.S. Cl. ................................... 106/481; 106/403; 106/436; 106/456; 106/489
[58] Field of Search ............... 106/403, 436, 456, 481, 106/489

[56] References Cited

U.S. PATENT DOCUMENTS

| | | | |
|---|---|---|---|
| 3,132,961 | 5/1964 | Keith et al. | 106/481 |
| 3,389,116 | 6/1968 | Saha | 106/481 |
| 3,649,588 | 3/1972 | Kennedy-Skipton | 106/481 |
| 4,325,739 | 4/1982 | Biermann et al. | 106/481 |
| 4,814,018 | 3/1989 | Tsurumaru et al. | 106/459 |
| 4,880,472 | 11/1989 | Bugnon et al. | 106/493 |

Primary Examiner—William R. Dixon, Jr.
Assistant Examiner—Willie J. Thompson
Attorney, Agent, or Firm—Dressler, Goldsmith, Shore, Sutker & Milnamow, Ltd.

[57] ABSTRACT

The invention relates to a method for the preparation of transparent metal oxide pigment, in which a substantial portion of the silicon oxide is dissolved off from silicon dioxide based particles coated with transparent metal oxide, and to a transparent metal oxide pigment prepared by the method. In the extraction methods according to the prior art the problem is that in the extraction a part of the metal oxide is also dissolved, whereby thickness variations impairing the interference color of the metal oxide layer are created. Moreover, in the known methods hard-treated extraction chemicals which are detrimental for the environment are used. These problems have by means of the present invention been solved so that such particles are selected for the dissolution whose silicon dioxide portion is substantially soluble in base and metal oxide portion is substantially insoluble in base, and the dissolution is carried out by base. The silicon dioxide based particles can be selected from the beginning base-soluble particles or they can be made base-soluble by extracting them with mineral acid. The shape of the metal oxide particles obtained through base extraction corresponds fragmentarily to the form of the outer surface of the silicon dioxide based particles and they are in the form of single closed sheets or flakes.

13 Claims, 1 Drawing Sheet

FIG. 1B ×3,000
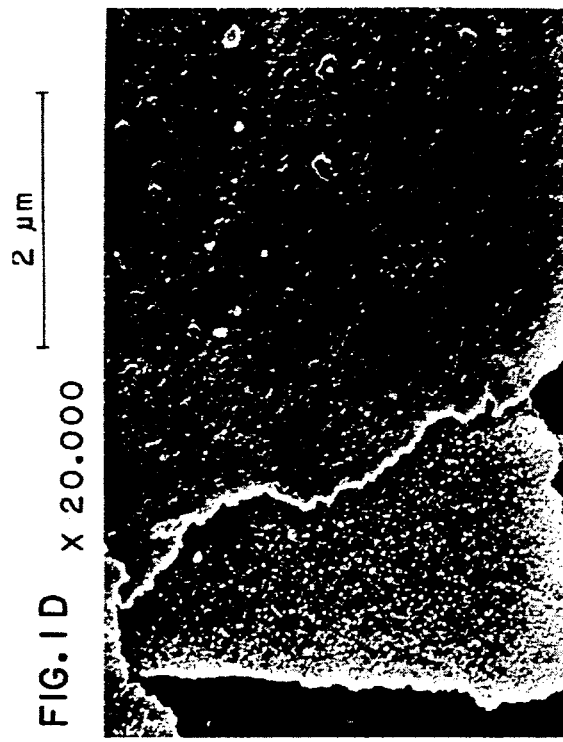
FIG. 1D ×20,000
FIG. 1A ×500
FIG. 1C ×10,000

TRANSPARENT METAL OXIDE PIGMENT AND METHOD FOR ITS PREPARATION

The present invention relates to a transparent metal oxide pigment and the method for its preparation, in which an essential part of the silicon dioxide is dissolved off from silicon dioxide based particles coated with transparent metal oxide.

Attempts have been made to produce a nacreous effect, interference color and color brightness by means of transparent metal oxides by stratifying them on silicon dioxide based particles suitable in size and shape. Thus, nacreous pigment has been prepared by coating layer silicate particles, such as mica particles, with a thin layer of transparent metal oxide, such as titanium dioxide in anatase or rutile form. Hereby, the problem has been that most mica-like layer silicates are too dark to form the substrate of a metal oxide pigment The lighter mica sorts, such as muscovite, are not so common as the dark ones and, accordingly, more expensive. Moreover, the layer silicates get dark in the calsination process used in the preparation of a metal-oxide-coated mica product.

Furthermore, the micas and other layer silicates coated with transparent metal oxide have the drawback that they are too heavy for dispersion and orientation in a suitable manner in the coating. The interference and reflection colors produced with them often are too faint due to the bad orientation and/or too extensive color distribution of the particles. Moreover, it is hard to grind the mica particles to a suitable size of nacreous pigment.

When stratifying transparent metal oxide on quarz or glass type particles, the color problems caused by the substrate are not too great. According to the U.S. Pat. No. 3,331,699 the adhesion, however, does not take place directly to the substrate, but through the oxide of another metal, such as tin. This intermediate layer can, for its part, cause color problems. Moreover, the quarz and glass type particles are as heavy as the mica particles and cause thus, they too, above-mentioned dispersion and orientation problems.

An endeavour has been made in the U.S. Pat. No. 4,192,691 to solve these problems. In the specification there is described a treatment of metal-oxide-coated muscovite particles at elevated temperature together with aqueous acid solution containing hydrofluoric acid and mineral acid until the desired amount of muscovite mica has been extracted. The substantially coreless pigment is well-dispersing and its interference color is brighter than an untreated pigment. By this known method using a very strong acid composition, it is possible to extract very efficiently mica from mica particles coated with a transparent metal oxide. A drawback is, however, that a strong acid composition also dissolves the titanium oxide. This holds good, particularly, for titanium oxide in anatase crystal form, a layer of which becomes so much thinner that the interference color of the pigment changes due to this treatment. Hereby, it is very difficult to regulate the extraction process so exactly that the desired color is achieved. Moreover, a lot of hard-treatable fluoride remain is produced in the process.

FI application print 871644 discloses a method for the preparation of nacreous pigment based on metal-oxide-coated mica or other layer silicate particles, in which of mica and other layer silicate particles and a metal-oxide-coating is prepared a prestage of coated mica and other layer silicate particles, in which prestage the metal-oxide-coating is scarcely or non-dissolvable in acid, and dissolving the thus obtained mica or other layer silicate particles with mineral acid, optionally together with an oxidizer. Hereby, the mica or other layer silicate particle substrate is partially dissolved in the acid so that the metaloxide-coated, substantially non-cationic and porous silicon dioxide bodies of the mica or other layer silicate particles remain.

Such a method, which is based on partial extraction, has been invented because the mineral acid treatment removes the color causing cations, e.g. the iron, from the dark mica sorts, such as phlogopite. The silicon dioxide bodies have been unextracted on purpose since the above-mentioned drawbacks would have been involved in their extraction and, moreover, the pigment particles furnished with silicon oxide bodies are stronger than the hollow metal oxide particles. The obtained pigments can, however, be too heavy for certain purposes and their interference colors can be too weak for producing the desired nacreous effect. Furthermore, it is difficult to grind pigment particles having the silicon dioxide body left, into a suitable nacreous pigment size.

Accordingly, the above-mentioned solutions belonging to the prior art are attached to many drawbacks and, moreover, their application views are too restricted. The aim of the above-mentioned invention is to provide a method for the preparation of a transparent metal oxide pigment by which the drawbacks mentioned can be removed. Thus, the invention is mainly characterized of the matters stated in the characterizing clause of the patent claims.

It has thus been realized that a transparent pigment consisting substantially of metal oxide can be prepared by selecting the silicon dioxide based particles coated with transparent metal oxide so that the silicon dioxide part is substantially soluble in base and the metal oxide part is substantially insoluble in base, and dissolving then a substantial part of the silicon dioxide with the base. The invention thus means that by selecting a suitable silicon based substrate or by treating it in a suitable manner for achieving the base solubility, the silicon dioxide can be dissolved by means of a simple base extraction. By the method according to the invention we thus get rid of the hydrofluoric dissolution according to the prior art and the drawbacks it brings about.

According to one embodiment of the invention the silicon dioxide based particles used in the method are originally base soluble material. Pure silicon dioxide silicate constructions having few cations are such compounds. The material is brought from melt state or solution to the desirable particle size and shape, after which they are coated with a base-insoluble metal oxide layer e.g. by precipitation or calsination, whereby they can according to the present invention be extracted with base.

According to another embodiment of the invention the silicon dioxide based particles used in the method are in the beginning insoluble in base. They are first coated with metal oxide coating so that the metal oxide coating is substantially insoluble in acid and base. Then the metal oxide-oxide-coated particles are dissolved with acid, preferably with mineral acid, optionally together with an oxidizer. As a result of the dissolution the silicon based particles become base soluble and the silicon oxide can be extracted away by a base.

Coating and acid extraction of this kind has been used in the FI application 871644 to improve the pigment, but that the silicon dioxide could then be removed by a simple base extraction was then not known or foreseen yet. It can thus be said that the object of the present invention is, also, the method for treating the coated silicate particles according to said FI application with a base, whereby the coating and acid extraction stages can be carried out according to the embodiment belonging to the scope of protection of said FI application.

The transparent metal oxide pigment according to the invention can consist of any suitable metal oxide, such as titanium dioxide in anatase or rutile form, oxide of trivalent iron, zirkonium oxide, zink dioxide, antimon oxide, chromium oxide, cobalt oxide, etc. It can also consist of a mixture of oxides, such as zinc/antimon oxide, cobalt/aluminate, etc. As the method according to the prior art is particularly detrimental to titanium dioxide in anatase crystal form, the present invention is particularly well suited for the preparation of anatase pigment.

The silicon oxide based particles used in the method according to the invention are preferably silicon dioxide, glass or silicate particles in layer or flake form. Particularly well suited for the preparation of nacreous pigments are the particles of layer silicates, such as mica, and glass particles. This kind of particles require, however, extraction with acid for the removal of cations from them. Not until a substantial portion of the cations have been removed they become base soluble and can be removed. Since the structure of light mica sorts does not favor a selective extraction of cations with acid, it is preferable to apply the invention to so-called dark mica sorts, such as phlogopite or biotite. A preferred breadth of the mica particles used is about 1–300 um and a preferred thickness about 0.1–5/um.

The silicon oxide based particles are coated with metal oxide which is substantially insoluble in extraction liquids. The coating is preferably carried out so that a prestage of metal oxide, e.g. hydroxide, oxihydrate or hydrate, is precipitated on the particles and the thus obtained particles are calsinated. The calsination can darken in some degree the silicon dioxide body of some particle sorts, but since in the present invention the silicon dioxide is dissolved off, the calsination stage does not cause any color damage for the pigment.

In the embodiment of the invention in which in the beginning of the base the insoluble particles are treated with acid for achieving the base solubility, it is preferably to use mineral acid, such as sulphuric acid, hydrochloric acid or nitric acid, for the dissolution. Moreover, it is preferable to carry out the acid dissolution together with some oxidizer, such as nitric acid or hydrogen peroxide. The concentration of the acid is preferably about 0.7–70% by weight, preferably about 1–50% by weight. The dissolution in acid is carried out at a temperature below about 100° C., preferably between 20° and 100° C., and the dissolution time is preferably about 2–30 hours.

The final transparent metal oxide pigment according to the invention is prepared by dissolving off with base a substantial portion of the silicon dioxide of the metal-oxide-coated silixon dioxide based particles. This takes place so that for the base dissolution is first selected such metal-oxide-coated particles that are soluble in base, or the metal-oxide-coated particles are treated to make their cores base soluble. Any base causing a dissolution effect is suitable for the actual base dissolution, e.g. sodium hydroxide or potassium hydroxide. Preferably, the concentration of the base is about 1–30% by weight, still more preferably about 5–20% by weight, and it is advantageous to use an aqueous solution. The temperature of the base extraction can be any temperature in which the silicon dioxide and base are in contact with each other. A preferable temperature is between 20°–110° C. and a still more preferable between 70°–90° C. The extraction time is preferably between 1–16 h, most preferably between 6–9 h. When with the dissolution methods according to the prior art hollow or porous pigment particles are obtained, with the method according to the present invention a transparent metal oxide pigment is obtained, the shape of whose particles only fragmentarily corresponds to the shape of the silicon dioxide based particles so that the pigment is in form of single closed sheets or particles. The fragmentarity can be due to the fact that the dissolution (with acid) or base releases the various surfaces of the metal oxide coat of the original particle, whereby the result is a multitude of loose, closed and very thin sheets. In FIG. 1 there is presented electron microscope photographs with different magnification of titanium dioxide pigment particles, which have been prepared by dissolving the cations and the silicon dioxide body off from the titanium-dioxide-coated mica particles.

As new kind of metal oxide particles are achieved by the method, the new protection also relates to them. The greatest dimension of these pigment particles being in the form of separate closed sheets preferably is about 1–300/um and the thickness preferably is about 0.001–0.3/um, most preferably about 0.01–0.2/um. By changing the conditions of the metal oxide precipitation the thickness can be regulated so as to reflect a certain color tone at an accuracy of below 0.001/um up to a thickness of 0.3/um.

The transparent metal oxide pigment according to the invention preferably does not contain more than 10% by weight of silicon dioxide. It contains at least 60% by weight and preferably at least about 90% by weight of metal oxide, e.g. titanium dioxide or iron oxide.

In the method according to the invention the control of the size and the shape of the crystals in the pigment particles is, moreover, possible with a very great accuracy, whereby a product is obtained that reflects very selectively a certain wavelength range. Hereby it is easier to control reproducably the decorative effect in applications, e.g. in paints and printing ink than e.g. with the hard-dispersing microcrystalline titanium dioxide.

Compared with the method, according to the U.S. Pat. No. 4,192,691, in which detrimental fluorine compounds are produced as by-products, the method according to the present invention produces waterglass as by-product, which is a harmless or even useful material. Moreover, in the known method the metal oxide corrodes, whereby pigment particles are formed which have various thicknesses and reflect occasional interference colors. In the present invention the thickness of the particles can be accurately regulated. Furthermore, the known particles are always hollow or porous, whereas the particles according to the present invention can, when so desired, be compact particles with even color.

According to the attached examples it is possible to prepare particles in sheet form by using sheetformed metal oxide pigment with silicon dioxide body according to the FI patent specification 871644 or prepared according to claim 2 of the present application.

EXAMPLE 1

40 g of nacreous pigment reflecting green light and consisting of mica coated with titanium dioxide, which has been treated with acid, is elutriated into 250 g of ion exchanged water. 45 g of sodium hydroxide granules is added to the suspension. The suspension is heated to a temperature of 80° C. The suspension is agitated for 5 hours at the above-mentioned temperature. Thereafter the solid matter is separated by filtering and washed. The washed product is dried at a temperature of 120° C. for 16 hours. A chemical analysis reveals that a nacreous pigment containing 93% $TiO_2$ and 4% $SiO_2$ has been obtained. The nacreous color is very strong and pure as to its tone.

EXAMPLE 2

40 g of nacreous pigment reflecting blue and consisting of mica coated with titanium dioxide is elutriated into 250 ml of sodium hydroxide solution containing 180 g/l sodium hydroxide. The suspension is heated to a temperature of 75° C. The mixture is agitated for 8 hours in this temperature. After this the pigment is separated from the suspension by filtering and washed. According to a chemical analysis the pigment contains 91% of $TiO_2$ and 6% of $SiO_2$.

EXAMPLE 3

80 g of nacreous pigment reflecting red color and consisting of mica coated with titanium dioxide is elutriated into 1000 ml of 7.5% potassium hydroxide solution. The suspension is heated to a temperature of 85° C. The mixture is agitated for 10 hours, after which the pigment is separated by filtering and washed. The product is dried for 20 hours at a temperature of 130° C. The ready pigment contains 89% of $TiO_2$ and 6% of $SiO_2$. The red nacreous color of the pigment is very pure.

EXAMPLE 4

10 g of nacreous pigment reflecting violet color, treated with acid, and consisting of mica coated with titanium dioxide is elutriated into 250 ml of 15% sodium hydroxide solution containing 180 g/l sodium hydroxide. The suspension is heated to a temperature of 70° C. for 5 hours. The pigment is separated by filtering from the mother solution and washed so as to contain no salt. The drying is carried out at a temperature of 110° C. for 20 hours. The nacreous pigment obtained contains 91% of $TiO_2$ and 5% of $SiO_2$ and reflects violet color.

EXAMPLE 5

15 g of acid-treated iron-coated mica pigment is elutriated into 500 g of ion-exchanged water. To the suspension is added 15 g of sodium hydroxide granules. The temperature of the suspension is raised to 80° C. The pigment is separated after 19 hours from the suspension and washed. The product obtained contains 90% iron oxide.

EXAMPLE 6

Acid-treated, titanium dioxide-coated mica pigment is elutriated into 15 g of water. 30 g of sodium hydroxide granules are added. The mixture is heated in 80° C. for 5 hours. The pigment is washed and dried. The titanium dioxide content of the product is over 90%. The titanium dioxide is in rutile form. The analysis gave:

|  | $TiO_2$, % |
| --- | --- |
| Original mica pigment | 20-50 |
| Acid-extracted pigment | 30-60 |
| Base-extracted pigment | over 90 |

We claim:
1. Method for the preparation of transparent metal oxide pigment-comprising dissolution of a substantial portion of the silicon dioxide from based particles coated with transparent metal oxide, characterized in that the dissolution particles whose silicon dioxide portion is substantially soluble in base and metal oxide portion- is substantially insoluble in base and carrying out the dissolution with base.
2. Method according to claim 1, characterized in that the particles are metal-oxide-coated silicate or glass particles, which have been pretreated to achieve base solubility by extraction with mineral acids selected from the group consisting of, sulphuric acid, hydrochloric acid or nitric acid, together with an oxidizer, namely hydrogen peroxide.
3. Method according to claim 2, characterized in that the silicate particles consist of layer silicate, selected from the group consisting of phlogopite or biotite.
4. Method according to claim 1, characterized in that the particles are metal- oxide-coated silicon dioxide particles or metal-oxide-coated.
5. Method according to claims 1, 2, 3 or 4, characterized in that the transparent metal oxide is titanium dioxide.
6. Method according to claims 1, 2, 3 or 4, characterized in that the silicon dioxide based particles coated with transparent metal dioxide have been prepared by precipitating the metal as hydroxide or oxihydrate onto the surface of the silicon dioxide based particles and then by thus calcinating the particles obtained.
7. Method according to claims 1, 2, 3 or 4, characterized in that the dissolution with base is carried out with sodium hydroxide or potassium hydroxide.
8. Method according to claims 1, 2, 3 or 4, characterized in that the dissolution with base is carried out with an aqueous solution the consistency of whose base is 1-30% by weight.
9. A transparent metal oxide pigment, characterized in that portion of the shape of the particles corresponds to the form of the outer surface of the silicon dioxide based particles and the particles are in the form of single closed sheets or flakes.
10. A pigment according to claim 9, characterized in that the greatest dimension of the particles is 1-300/um and the thickness is 0.001-0.3/um.
11. Pigment according to claim 9 or 10, characterized in that it does not contain more than 10% by weight of silicon dioxide.
12. Pigment according to claim 9 or 10, characterized in that it contains at least 60% by weight of titanium dioxide.
13. Pigment according to claim 9 or 10, characterized in that it contains at least 60% by weight of iron oxide.

* * * * *

UNITED STATES PATENT AND TRADEMARK OFFICE
CERTIFICATE OF CORRECTION

PATENT NO. : 5,076,849

DATED : December 31, 1991

INVENTOR(S) : Pekka J. Vapaaoksa and Pekka J. Eskelinen

It is certified that error appears in the above-identified patent and that said Letters Patent is hereby corrected as shown below:

Column 4, line 22, "FIG. 1" should be --FIGS. 1A, 1B, 1C, and 1D--

On the title page, item [30], insert

--Foreign Application Priority Data:
    Dec. 28, 1988[FI] Finland 88.6018--

Signed and Sealed this

Sixth Day of April, 1993

*Attest:*

STEPHEN G. KUNIN

*Attesting Officer*   Acting Commissioner of Patents and Trademarks